Sept. 29, 1942.   C. F. W. BORGWARD   2,297,198
CHASSIS FRAME
Filed Dec. 15, 1938   2 Sheets-Sheet 1
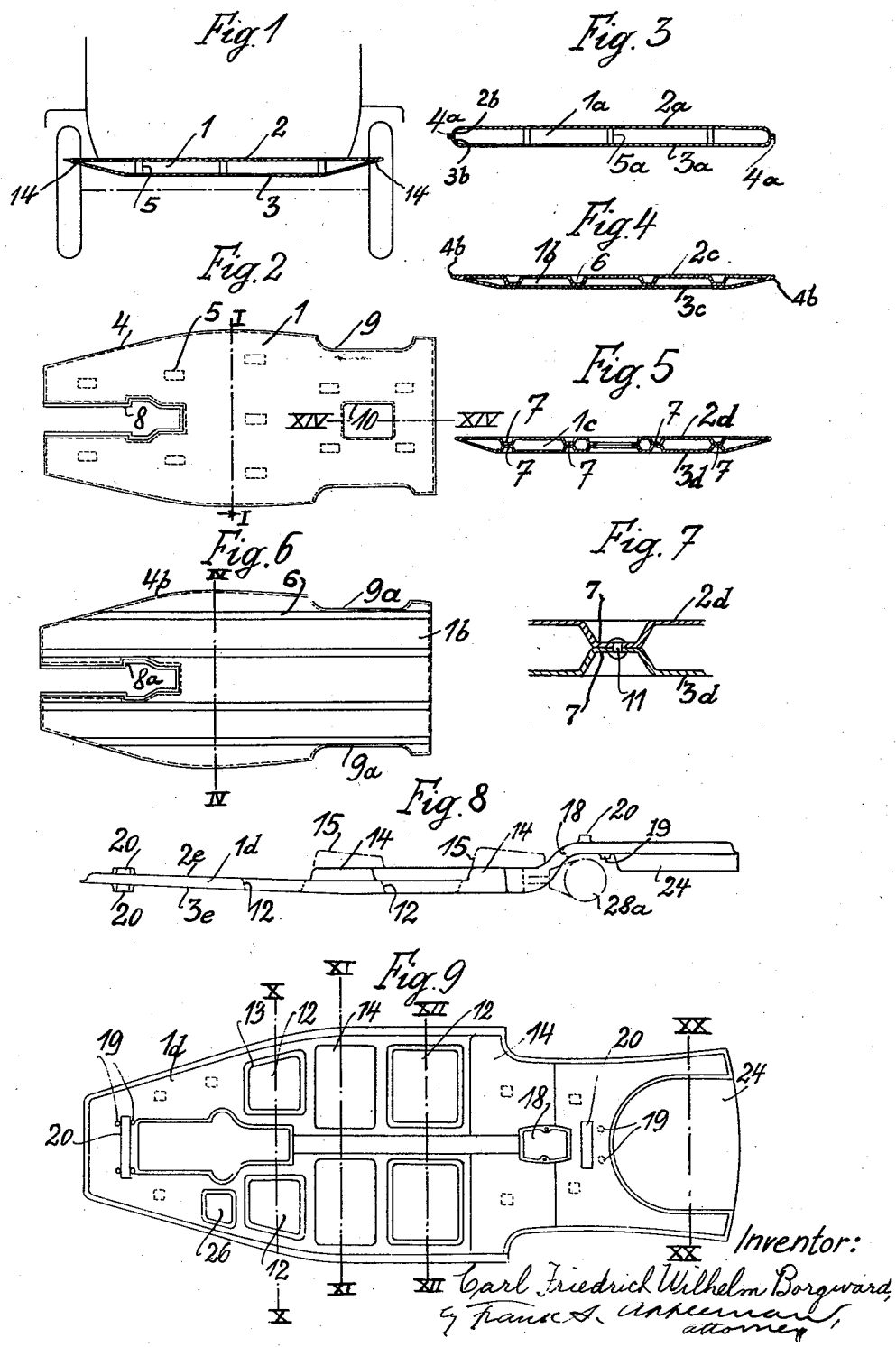

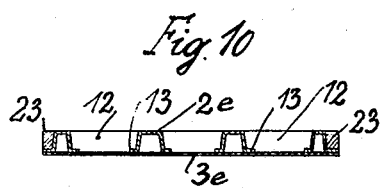
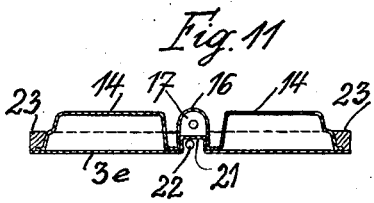
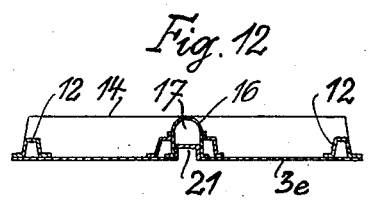
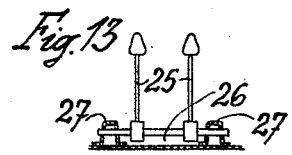
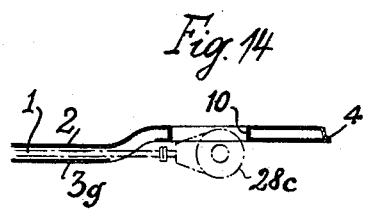
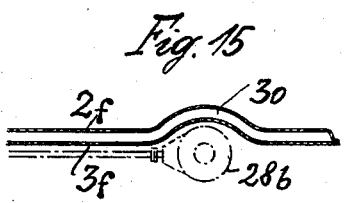
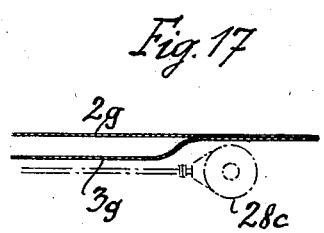
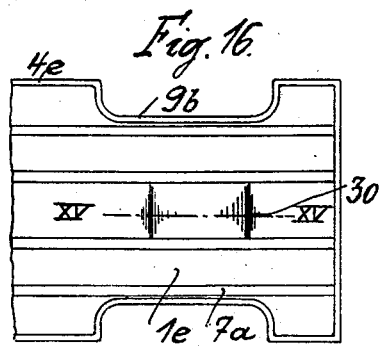
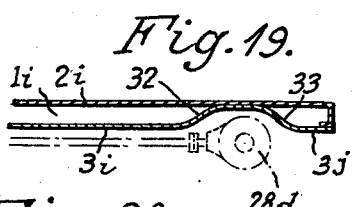
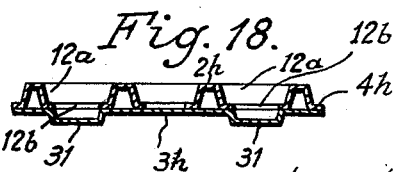

Patented Sept. 29, 1942

2,297,198

UNITED STATES PATENT OFFICE 2,297,198

CHASSIS FRAME

Carl Friedrich Wilhelm Borgward, Bremen, Germany; vested in the Alien Property Custodian Application December 15, 1938, Serial No. 245,997

6 Claims. (Cl. 280—106)

This invention relates to chassis frames for motor vehicles and the like, the frames being constructed of sheet metal or metal plates and forming a hollow member extending the length and breadth of the vehicle.

Hollow frames are known wherein a lower plate of metal is dished or shaped like a trough and covered by an upper plate, the plates being connected together only at the edges.

One object of the present invention is to provide a light sheet metal chassis frame which is strong and resistant to bending and twisting, and the invention consists essentially in the provision of a chassis frame for motor vehicles and the like comprising a hollow member extending the length and breadth of the vehicle and formed of two superposed metal plates connected together along their edges and at points on their surfaces. As the points of connection are distributed over the whole area of the plates, the connecting means can be placed advantageously and made of suitable size so that a very strong frame results. A hollow frame of this kind permits of more clearance being obtained below low-built vehicles without special longitudinal supports being provided, and moreover, owing to the rigidity of the frame, the motor and gearing and the like may be mounted on it directly. Further features of the invention reside in the special construction of the frame, and by way of example certain embodiments are shown in the accompanying drawings in which:

Fig. 1 is a fragmentary and diagrammatic end view of a vehicle with the chassis frame in section on the line I—I of Fig. 2, Figs. 2 and 6 are plan views of two different forms of the frame, Fig. 3 is a cross section of a modified form of the invention, Fig. 4 is a section on the line IV—IV of Fig. 6, Fig. 5 is a cross section of a further modification of the invention, Fig. 7 is an enlarged fragmentary view of the section shown in Fig. 5, Fig. 8 is a side elevation of a fifth modification of the frame, Fig. 9 is a plan view corresponding to Fig. 8, Fig. 10 is a section on the line X—X of Fig. 9, Fig. 11 is a section on the line XI—XI of Fig. 9, Fig. 12 is a section on the line XII—XII of Fig. 9.

Fig. 13 is a view of a detail showing the manner of supporting control levers in the form shown in Fig. 9, Fig. 14 is a section on the line XIV—XIV of Fig. 2, Fig. 15 is a section on the line XV—XV of Fig. 16, Fig. 17 is a fragmentary section similar to the section shown in Fig. 15 but showing a modification thereof, Fig. 16 is a plan view corresponding to Fig. 15.

Fig. 18 is a view similar to Fig. 10 but showing a slight modification thereof;

Fig. 19 is a view similar to Fig. 17 but showing a slight modification thereof;

Fig. 20 is a section on the line XX—XX of Fig. 9.

The chassis frame as shown in Figs. 1, 2 and 14 comprises a hollow member 1 formed by the plates 2 and 3 which are connected along their edges, for instance by welding or riveting for which purpose the edges may be provided with flanges 4. At least one of the plates must be flanged or dished to form the hollow member. Fig. 1 shows the lower plate with its edges bent upwards to form the dished member. As shown in Figs. 1 and 2 the connecting means 5 inside the boundaries of the plates may consist of blocks, for example of wood or metal, distributed as shown in Fig. 2 and secured against displacement. In the form shown in Fig. 3, both plates are dished. In this form the hollow member or flat box 1a is formed by the plates 2a and 3a each of which is curved at its edges as at 2b and 3b, the curved portions being provided with securing flangse 4a as before. Spacing blocks 5a are provided between the upper and lower plates as in the first form. In the form shown in Figs. 6 and 4, the shallow box 1b is formed from an upper plate 2c and a dished lower plate 3c. The plates are secured together at their contacting edges 4b. The plate 2c is provided with downwardly pressed channels 6 which engage the plate 3c and form the connecting means between the upper and lower plates. In Figs. 5 and 7 a modification of these channel spacers is shown and in this form connecting means may be formed by impressing portions 7 of both plates as shown in Figs. 5 and 7 so that the bottom of the channels 7 come together intermediate the bodies of the plates 2d and 3d which form the shallow box 1c. The contacting channels are secured together in any preferred manner as, for instance, the rivets 11 of Fig. 7.

In Figs. 2 and 14 the forward portion of the box is forked to provide a slot 8 for the reception of engine parts and at the rear there is provided an opening 10 for the differential gear case 28. Also, wheel recesses 9 are provided opposite the opening 10. In Fig. 6 the forward end of the box is slotted as at 8a and the rear sides are recessed as at 9a in a manner corresponding to the first form.

Figs. 8 and 9 show the plates 2e and 3e forming the box 1d provided with impressed portions for special purposes. The upper plate 2e is provided with impressed portions 12 forming boxes for the feet of passengers, and so that these may be as deep as possible the bottom portion may be removed as in Fig. 10, the edges 13 of the resulting flanges laying in contact with the lower plate, to which they may be welded. Accommodation (Figs. 8 and 9) may be provided for the axles by offsetting the rear portion of the box structure upwardly above the front portion and providing an opening 18 for the upper part of the differential gear case 28a. Reinforcements 19 may also be placed for engagement with the fastenings of the axles. These reinforcements may, for example, consist of small tubes or welded plates. Portions 20 of the plates may be raised for engagement with the carriage springs transmitting the load between the axles and the frame.

At the rear the lower plate may be depressed as shown in Figs. 8 and 9, so that a box 24 open at the rear is available for the reception of a spare wheel.

In Figs. 8, 9 and 11 it is shown how an elevated portion 14 of the upper plate can be located behind the foot boxes 12, these elevated portions serving as bases for the seats 15. Fig. 11 further shows how one plate can be formed with a channel 16 which is part of a tunnel for the transmission shaft 17. Below this the lower plate 3e is pressed up at 21 to complete the tunnel and to leave a passage for the exhaust pipe 22. Around the edges are bearers 23 on which the body of the vehicle rests.

Fig. 12 shows in cross-section the formation of the foot boxes 12 behind which are the seat bases 14.

Fig. 13 shows how the bearings for the shafts of the control levers 25 may be formed directly in the walls 27 of a recess 26. The metal plates may also be formed to serve directly as bearings for any desired shaft, bushes for the shaft being attached to the plate if necessary. It is also possible by suitably shaping the plates to form therefrom part or all of the crank-case, gearcase, or rear axle housing or the like.

Figs. 15 and 16 show how the plates 2f and 3f can be bent up to form a protuberance 30 below which the differential gear case 28b is situated so as to project as little as possible below the plane of the frame. The plates 2f and 3f form the usual box 1e provided with uniting flanges 4e, wheel recesses 9b and channel spacers 7a.

Fig. 17 shows a construction in which only the lower plate 3g is bent upwardly to the depth of the hollow member in order to make room for the differential gear case 28c. In this form the plate 3g is raised far enough to engage the upper plate 2g.

In Fig. 18 there is shown a form of the invention wherein the box structure is formed from an upper plate 2h and a lower plate 3h united by flanges 4h. The upper plate is provided with pockets 12a having open bottoms 12b and the lower plate is provided with depressed foot receiving pockets 31.

In Fig. 19 a modification of the form shown in Fig. 17 is disclosed. In this form, there is the usual upper plate and lower plate, here shown at 2i and 3i. The plate 3i is pressed upwardly as at 32 to engage the plate 2i over the differential gear case 28d and then is bent down as at 33 to provide a rear portion 3j alined with the forward part of the plate 3i.

I claim:

1. Chassis frame for a motor vehicle including an engine, comprising a hollow member extending the length and breadth of the vehicle and formed of two superposed metal plates connected together along their edges and at points on their surfaces, said plates having an aperture for the accommodation of said engine, said plates being connected together around the edges of said aperture, the upper plate having recessed apertures for foot rests, the said lower plate being provided with depressions opposite the foot rest apertures in the upper plate.

2. Chassis frame for a motor vehicle comprising a hollow member extending the length and breadth of the vehicle and formed of two superposed metal plates at least one whereof is dished to engage at its edges with the edges of the other, said plates being connected together along their edges and at points on their surfaces, control levers for said vehicle having shafts, the upper plate being formed with recesses having walls, said walls being adapted to constitute bearings for said shafts of the control levers of the vehicle.

3. A hollow metal member consisting of two superimposed and mutually supporting metal plates, said hollow member extending the entire width of the body and length of a vehicle and serving as a vehicle frame for power vehicles, characterized in that the metal plates are superimposed on each other and joined at the edges and support each other by means of supporting means distributed over the entire area of the metal plates and which particularly may be formed by indentations which are present in at least one of said plates, said indentations including impressed parts formed in the upper metal plate and having apertures therethrough, said impressed portions contacting the lower plates, and fastening means extending through said apertures and connecting the upper and lower plates together.

4. A hollow metal member consisting of two superimposed and mutually supporting metal plates, said hollow member extending the entire width of the body and length of a vehicle and serving as a vehicle frame for power vehicles, characterized in that the metal plates are superimposed on each other and joined at the edges and support each other by means of supporting means distributed over the entire area of the metal plates and which particularly may be formed by indentations which are present in at least one of said plates, said indentations including impressed parts in the upper metal plate and indentations in the lower metal plate for forming foot rests.

5. A hollow metal member consisting of two superimposed and mutually supporting metal plates, said hollow member extending the entire width of the body and length of a vehicle and serving as a vehicle frame for power vehicles, characterized in that the metal plates are superimposed on each other and joined at the edges and support each other by means of supporting means distributed over the entire area of the metal plates and which particularly may be formed by indentations which are present in at least one of said plates, further characterized in that the upper metal plate has impressed portions forming seat carriers, and indentations in said upper metal plate adjacent said seat carriers and providing foot boxes.

6. A hollow metal member consisting of two superimposed and mutually supporting metal plates, said hollow member extending the entire width of the body and length of a vehicle and serving as a vehicle frame for power vehicles, characterized in that the metal plates are superimposed on each other and joined at the edges and support each other by means of supporting means distributed over the entire area of the metal plates and which particularly may be formed by indentations which are present in at least one of said plates, further characterized in that indentations include ribs, said ribs having portions formed to provide bearings for shafts of operating levers.

CARL FRIEDRICH WILHELM BORGWARD.